(12) United States Patent
Ayle et al.

(10) Patent No.: US 8,579,076 B2
(45) Date of Patent: Nov. 12, 2013

(54) SPLICING OF CURVED ACOUSTIC HONEYCOMB

(75) Inventors: Earl Ayle, Chandler, AZ (US); Rickey L. Burchett, Arizona City, AZ (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 13/407,846

(22) Filed: Feb. 29, 2012

(65) Prior Publication Data

US 2013/0220731 A1    Aug. 29, 2013

(51) Int. Cl.
*E04B 1/82*    (2006.01)

(52) U.S. Cl.
USPC ............................ 181/229; 181/210; 181/213

(58) Field of Classification Search
USPC .................................. 181/210, 213, 214, 292
See application file for complete search history.

(56) References Cited

U.S. PATENT DOCUMENTS

| | | | | |
|---|---|---|---|---|
| 4,258,823 A * | 3/1981 | Ganz et al. | ............ | 181/214 |
| 4,346,134 A * | 8/1982 | Hilton | ............ | 428/116 |
| 5,938,875 A * | 8/1999 | Jessup et al. | ............ | 156/79 |
| 6,039,832 A * | 3/2000 | McCarville | ............ | 156/292 |
| 6,945,111 B2 * | 9/2005 | Georgeson | ............ | 73/600 |
| 7,296,656 B2 * | 11/2007 | Sanicki et al. | ............ | 181/210 |
| 7,434,659 B2 * | 10/2008 | Ayle | ............ | 181/292 |
| 7,797,809 B2 * | 9/2010 | Costa et al. | ............ | 29/458 |
| 7,866,440 B2 * | 1/2011 | Douglas | ............ | 181/213 |
| 2008/0047121 A1 | 2/2008 | Douglas | | |
| 2011/0232991 A1 * | 9/2011 | Welch et al. | ............ | 181/213 |

FOREIGN PATENT DOCUMENTS

| EP | 0798107 A2 | 10/1997 |
|---|---|---|
| EP | 1621752 A2 | 2/2006 |

* cited by examiner

*Primary Examiner* — Jeremy Luks
(74) *Attorney, Agent, or Firm* — W. Mark Bielawski; David J. Oldenkamp

(57) ABSTRACT

Honeycomb sections are bonded together with seams made up of an adhesive that is carried by a honeycomb seam support or a linked-segment seam support. The seams are particularly useful for splicing together curved honeycomb sections that contain acoustic septum. The curved acoustic honeycomb sections are spliced or seamed together to form engine nacelles and other acoustic dampening structures.

16 Claims, 6 Drawing Sheets

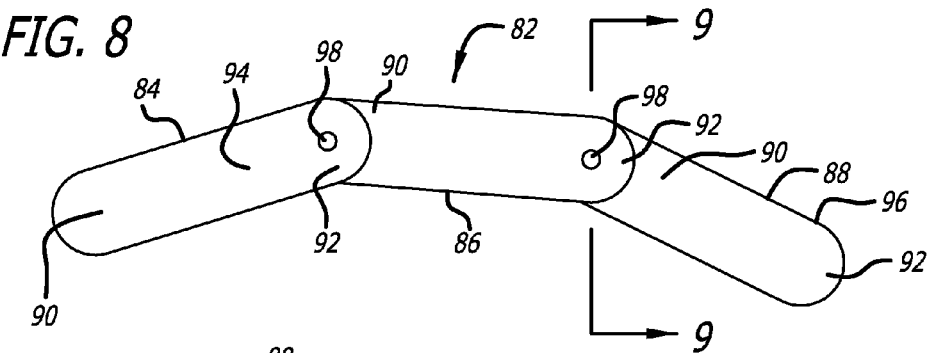
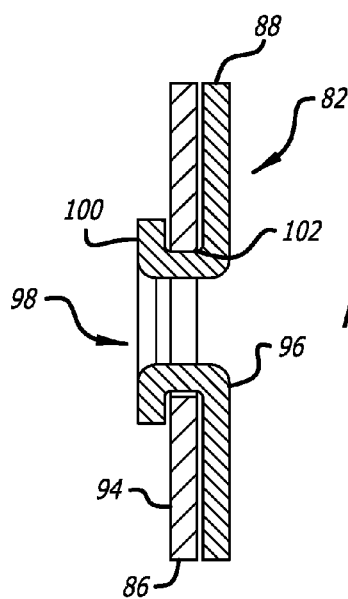
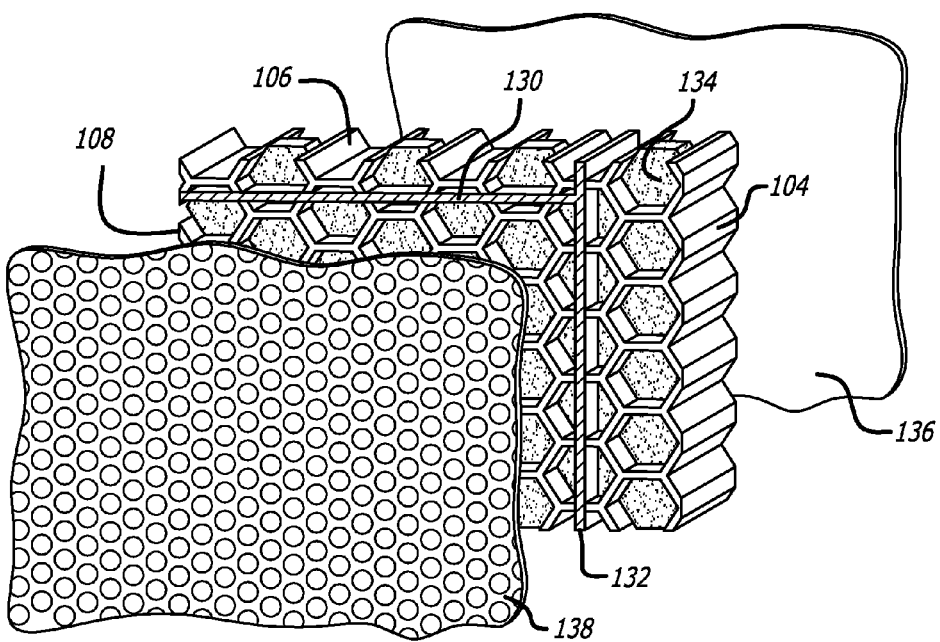

us 8,579,076 B2

SPLICING OF CURVED ACOUSTIC HONEYCOMB

BACKGROUND OF THE INVENTION

1. Field of the Invention

The present invention relates generally to connecting the sides of two or more acoustic honeycomb sections together to form a spliced acoustic honeycomb. More particularly, the invention is directed to providing improved seams between acoustic honeycomb sections, especially where multiple honeycomb sections are connected together to form a contoured or curved acoustic honeycomb structure.

The invention is particularly useful for seaming or splicing together curved acoustic honeycomb sections that are seamed together to form engine nacelles and other acoustic dampening structures.

2. Description of Related Art

It is widely recognized that the best way of dealing with excess noise generated by a specific source is to treat the noise at the source. This is typically accomplished by adding acoustic treatments to the structure at the noise source. One particularly problematic noise source is the jet engine used to propel aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine. The basic problem that faces engineers is how to add these thin and flexible acoustic materials into the structural elements of the jet engine and surrounding nacelle to provide desired noise attenuation.

Honeycomb has been a popular material for use in aircraft and aerospace vehicles because it is relatively strong and lightweight and each honeycomb cell can be used as an acoustic resonator. For acoustic applications, the goal has been to somehow incorporate the thin acoustic materials into the honeycomb structure so that the honeycomb cells are closed or covered. The closing of the cells with acoustic material creates the acoustic impedance upon which the resonator is based.

Forming acoustic style honeycomb into complex curved structures required for engine nacelles is a major design consideration. It is very difficult to form a single honeycomb into an engine nacelle without significantly altering the honeycomb and its acoustic properties. Accordingly, numerous sections of curved or slightly curved acoustic honeycomb sections are typically spliced together to form the cylindrical nacelle structure.

The sides of the honeycomb that are spliced together are composed of numerous protruding cell walls that are typically referred to as "dog ears". The protruding cell walls that make up the dog ears have ends that present a relatively small surface area for bonding of the two honeycomb sections together. In addition, it is very difficult to position the honeycomb sections so that the ends of the dog ears on opposing honeycomb sections are lined up and close enough for bonding.

The preceding bonding/splicing issues have been typically solved by filling the seam line, and the partial cells that border the seam line, with an adhesive. The adhesive is used to completely fill all of the open spaces along the seam line to provide a solid and secure bond. For aerospace applications, the adhesive is typically a foam-type adhesive to keep the weight of the seam at a minimum. An advantage of filling the seam line and surrounding partial cells with adhesive is that the surface area of the honeycomb which is available for bonding is much larger than the surface area provided by the ends of the dog ears. A strong bond is achieved due to the relatively large surface area of honeycomb that interacts with the adhesive to form the seam. In addition, a foam-type adhesive can be used to bond together honeycomb sides that are curved and/or serpentine. Since bonding is accomplished by simply filling the seam line with adhesive, the shape and orientation of the dog ears and partial cells along the seam line can vary without affecting the overall performance of the seam.

The use of an adhesive seam line does have disadvantages. For example, the acoustic properties of the honeycomb cells that are filled with adhesive are significantly altered or destroyed. Solid adhesive seams tend to be wide and relatively heavy, which is not desirable for aerospace applications where limiting weight is an important design consideration. Also, the strength of the seam can vary depending upon the orientation of the dog ears on opposite sides of the seam line. In addition, the relatively wide adhesive seams tend to be stiff and may limit the ability to bend or otherwise shape the overall bonded honeycombs into a curved structure, such as an engine nacelle.

It would be desirable to provide a way of splicing or seaming honeycomb together that includes the advantages in bond strength provided by the solid adhesive seams described above while avoiding the disadvantages with respect to acoustic properties, seam weight and seam stiffness.

SUMMARY OF THE INVENTION

In accordance with the present invention, it was discovered that narrow and strong seams can be provided between honeycomb sections when a flexible adhesive support is used in combination with the adhesive. The supported seams are much thinner than prior foam-type adhesive seams and can be used regardless of whether or not the protruding ends of the honeycomb are aligned along the seam. The thinner seams provided by the invention minimize any interference with the acoustic properties of the spliced honeycomb. In addition, the supported seams of the invention are flexible so that they can be used to bond curved honeycomb together. The formation of serpentine seams between honeycomb sections is also possible.

The spliced honeycombs of the invention include at least a first honeycomb section and a second honeycomb section that are bonded together along their sides. Each honeycomb section has a first edge and a second edge. The honeycomb sections each include a plurality of walls that extend between their first and second edges. The walls define a plurality of honeycomb cells wherein each of the honeycomb cells has a cross-sectional area measured perpendicular to honeycomb walls and a depth defined by the distance between the first and second edges of the honeycomb. The honeycomb sections each includes at least one side that has a plurality of protruding honeycomb walls that each has a wall end having a thickness and a length which extends between the first edge and second edge of each of the honeycomb sections.

As a feature of the invention, the two honeycomb sections are bonded together with a seam that is located between the sides of the two honeycomb sections. The seam has a depth extending between the first and second edges of the honeycomb sections, a thickness and a seam length that extends along the sides of the honeycomb sections. The seam is composed of an adhesive for bonding to the ends of the protruding honeycomb walls and a support for the adhesive. The use of a support for the adhesive was found to provide desired bonding of the honeycomb sections together without filling the cells along the seam with adhesive.

As a particular feature of the invention, the support for the adhesive is a relatively thin honeycomb seam support. The honeycomb seam support includes a first edge located adjacent to the side of one honeycomb section and a second edge located adjacent to the side of the other honeycomb section. The honeycomb seam support includes a plurality of walls that extend between the first and second edges of the honeycomb seam support. The walls form a plurality of seam cells that are perpendicular to the cells of the honeycomb sections. The adhesive is located within the seam cells so that the adhesive bonds to both the seam cells and the walls that protrude from the sides of the honeycomb sections.

As another particular feature of the invention, the support for the adhesive is a linked-segment seam support that is made up of a plurality of seam support members that each has a first end, a second end, a first side located adjacent to a side of one honeycomb section and a second side located adjacent to a side of the other honeycomb section. The adhesive is located on both sides of the seam support members so that the adhesive bonds to both the seam support members and the protruding dog ears of the honeycomb sections. In order to provide flexibility to the seam, flexible joints are provided that link the first end of one seam support member to the second end of another seam support member. This type of chain-link configuration was found to be effective in providing both strong and flexible honeycomb seams.

The present invention is directed to the seam(s) and the overall spliced honeycomb structure. The invention is also directed to methods for splicing the honeycomb sections together. Methods for shaping or forming the honeycomb sections into desired structures before and/or after the sections are seamed together are also included. The seams of the present invention are particularly useful for seaming acoustic honeycomb sections together to form curved acoustic honeycomb structures, such as those found in jet engine nacelles The above described and many other features and attendant advantages of the present invention will become better understood by reference to the following detailed description when taken in conjunction with the accompanying drawings.

BRIEF DESCRIPTION OF THE DRAWINGS

FIG. 8 shows an exemplary linked-segment seam support in accordance with the present invention.

FIG. 9 is a sectional view of the linked-segment seam support shown in FIG. 8 which shows details of the flexible joint between the two linked segments FIG. 10 is a view of a partial acoustic panel prior to assembly where the panel includes three sections of honeycomb and two seams. Shows an exemplary honeycomb configuration that can be spliced together and/or used as the honeycomb seam support in accordance with the present invention.

DETAILED DESCRIPTION OF THE INVENTION

The present invention may be used to seam, splice or connect together a wide variety of complex honeycomb types and shapes. The honeycomb may be made from any suitable material provided that the material is amenable to bonding with an adhesive. The cut edges of the honeycomb (dog ears) should be without burrs and straight (90° to the surface) and the acoustic septum must also be without burrs and straight. The seams in accordance with the invention are particularly useful in splicing sections of acoustic honeycomb together to form curved structures, such as nacelles for jet engines. The following detailed description is focused mainly on splicing acoustic honeycomb together. It is understood that the described seams may also be used in splicing a wide variety of other types of acoustic and non-acoustic honeycomb sections together where a strong, light weight and relatively thin seam is desired.

Figure 1:
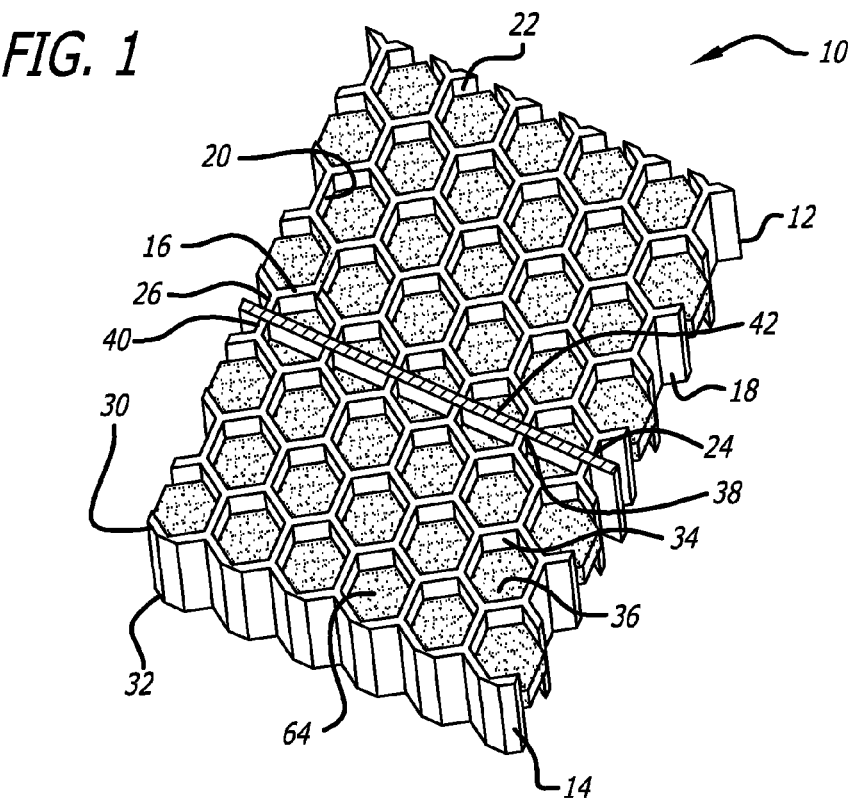
FIG. 1 shows two honeycomb sections that are spliced or bonded together in accordance with the present invention. In this embodiment, the ends of the protruding honeycomb cell walls (dog ears) along the sides of the honeycomb sections are aligned at the seam.

A spliced acoustic honeycomb in accordance with the present invention is shown generally at 10 in FIG. 1. The seamed honeycomb 10 includes a first honeycomb section 12 and a second honeycomb section 14. The honeycomb sections 12 and 14 can be made from any of the conventional materials used in making honeycomb panels including metals, ceramics, and composite materials. Exemplary metals include aluminum and aluminum alloys. Exemplary composites include fiberglass, Nomex and various combinations of graphite or ceramic fibers with suitable matrix resins. Exemplary matrix resins include thermosetting or thermoplastic resins where the thermosetting resin may or may not be toughened with a thermoplastic resin.

Figure 14:
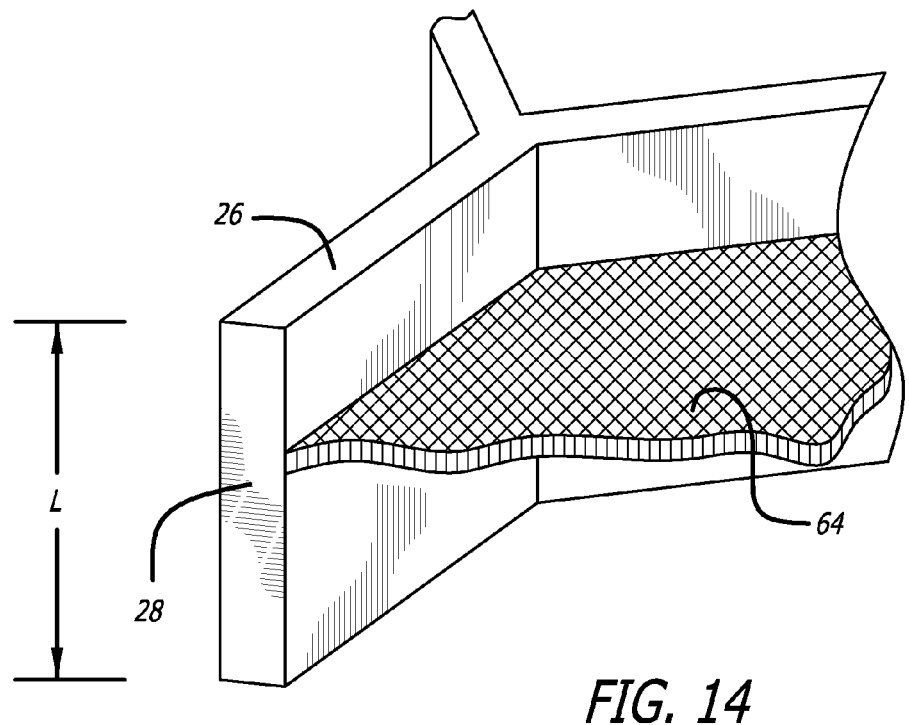
FIG. 14 is a detailed view of a wall (dog ear) protruding from the side of one of the honeycomb sections shown in FIG. 1.

The first honeycomb section 12 has a first edge 16, which is to be located nearest the noise source, and a second edge 18. The first honeycomb section 12 includes walls 20 that extend between the two edges 16 and 18 to define a plurality of cells 22. Each of the cells 22 has a depth (also referred to as the core thickness) that is equal to the distance between the two edges 16 and 18. Each cell 22 also has a cross-sectional area that is measured perpendicular to the cell walls 20. The first honeycomb section 12 has a first honeycomb side 24 that includes a plurality of protruding honeycomb walls or dog ears 26, one of which is shown in detail in FIG. 14. Each protruding wall 26 has a wall end 28 having a length (L) extending between the first edge 16 and the second edge 18. The wall end 28 also has a width or thickness (T).

The second honeycomb section 14 also has a first edge 30 and a second edge 32. The second honeycomb section 14 includes walls 34 that extend between the two edges 30 and 32 to define a plurality of cells 36. Each of the cells 36 has a depth that is equal to the distance between the two edges 30 and 32. Each cell 36 also has a cross-sectional area that is measured perpendicular to the cell walls 34. The second honeycomb section 14 has a second honeycomb side 38 that includes a plurality of protruding honeycomb walls 40. Each of the protruding walls 40 also have a wall end that is shaped the same as the wall end 28 of the honeycomb section 12 as shown in detail in FIG. 14. Accordingly, each protruding wall 40 also has a wall end having a length (L) extending between the first edge 30 and the second edge 32 and a width or thickness (T).

As shown in FIG. 1, the sides 24 and 38 of honeycomb sections 12 and 14, respectively, are spliced together by a seam 42 that is composed of an adhesive and a support for the adhesive in accordance with the present invention. The seam 42 has a depth extending between the first edges (16 and 30) of the honeycomb sections (12 and 14) and the second edges (18 and 32) of the honeycomb sections (12 and 14). The seam 42 also has a thickness and a seam length that extends along the first and second honeycomb sides 24 and 38. The two sections of honeycomb shown in FIG. 1 are oriented so that the ends of the protruding honeycomb walls 26 and 40 are aligned at the seam 42.

Figure 2:
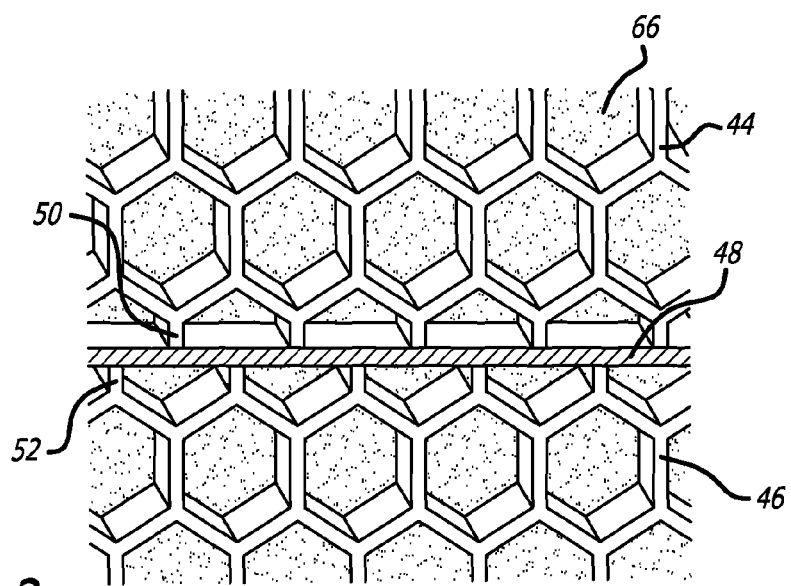
FIG. 2 shows an embodiment of the invention where two honeycomb sections are spliced together such that the ends of the protruding honeycomb cell walls are not aligned at the seam.

As a feature of the invention, it is not required that the protruding honeycomb walls (dog ears) be aligned across the seam 42 as shown in FIG. 1. An alternate exemplary spliced honeycomb is shown in FIG. 2 where the protruding honeycomb walls are not aligned across the adhesive seam. In FIG. 2, the respective sides of a first honeycomb section 44 and second honeycomb section 46 are bonded together by way of a supported adhesive seam 48 in accordance with the invention. The ends of the protruding honeycomb walls 50 and 52 located on opposite sides of the seam 48 are not aligned. It was discovered that the supported adhesive seam 48 is sufficiently strong that it is not necessary to align the protruding cell walls at the seam junction.

Figure 3:
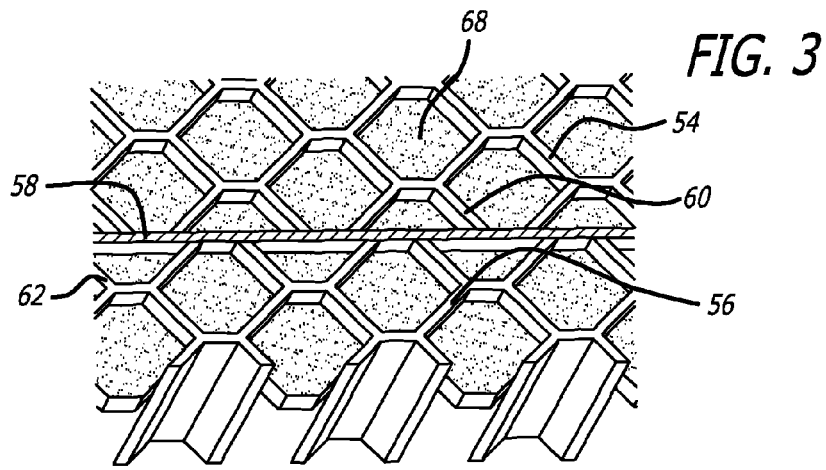
FIG. 3 shows a portion of another seam where the protruding honeycomb cell walls on each side of the seam are not aligned.

Another non-aligned spliced honeycomb is shown in FIG. 3 where a different configuration of non-aligned dog ears is shown. In FIG. 3, the respective sides of a first honeycomb section 54 and second honeycomb section 56 are bonded together by way of a supported adhesive seam 58 in accordance with the invention. The ends of the protruding honeycomb walls 60 and 62 located on opposite sides of the seam 58 are not aligned. Again, it was discovered that the supported adhesive seam 58 is sufficiently strong that it is not necessary to align the protruding cell walls at the seam junction.

The supported adhesive seams of the present invention are particularly well-suited for splicing acoustic honeycomb sections together. The seams are relatively narrow and do not interfere significantly with the acoustic properties of the acoustic cells located along the seams. Acoustic honeycomb includes one or more septums located within most, if not all of the honeycomb cells. Although any type of septum may be used, it is preferred that septums be the type described in detail in U.S. Pat. Nos. 7,434,659; 7,510,052 and 7,854,298. These types of septums are preferred because they are relatively flexible and retain their acoustic absorption properties when the honeycomb is formed into curved (non-planar) structures, such as the honeycomb sections that are spliced together to form jet engine nacelles.

The septum caps are shown in FIG. 1 at 64 and at 66 and 68 in FIGS. 2 and 3, respectively. Any of the acoustic materials typically used in acoustic honeycombs may be used to form the septum caps. Acoustic materials are typically provided as relatively thin sheets that are perforated, porous or an open mesh fabric that is designed to provide noise attenuation. Perforated and porous sheets of various materials (metals, ceramics and plastics) may be used. In one preferred embodiment the acoustic material is an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP), polyether ether ketone (PEEK), polyamide 6 (Nylon, 6 PA6) and polyamide 12 (Nylon 12, PA12) are just a few examples. Open mesh fabric made from PEEK is preferred for high temperature applications. Open mesh acoustic fabrics are available from a wide variety of commercial sources. For example, sheets of open mesh acoustic fabric may be obtained from SEFAR America Inc. (Buffalo Division Headquarters 111 Calumet Street Depew, N.Y. 14043) under the trade names SEFAR PETEX, SEFAR NITEX and SEFAR PEEKTEX.

Solid sheets of acoustic material can also be used to form the septum caps. In this case, perforations are formed in the solid sheet material either before or after the septum cap is placed within the honeycomb cell. Although metals, ceramics and plastics of the type identified above may be used to make perforated septums, it is preferred that the acoustic material be PEEK or a similar chemically resistant polymer material that is suitable for high temperature applications. Sheets or films of PEEK are available commercially from a number of sources, such as Victrex USA (Greenville, S.C.) which produces sheets of PEEK under the tradename VICTREX® PEEK™ polymer. Additional details regarding septum caps and their use in acoustic honeycombs are provided in U.S. patent application Ser. Nos. 13/227,775 and 13/279,484.

The seams of the invention include an adhesive and a support for the adhesive. The adhesive can be any suitable adhesive that is typically used in connection with the fabrication of honeycomb panels. The same adhesives that are used to bond the septum caps to the honeycomb are generally also suitable for use as the seam adhesive. Preferred adhesives include those that are stable at high temperature (300-400° F.). Exemplary adhesives include epoxies, acrylics, phenolics, cyanoacrylates, bismaleimides, polyamide-imides, and polyimides. Polyamide-imide adhesives are particularly preferred.

The support for the adhesive should be a structure that is relatively thin and which is sufficiently strong so that it provides additional strength to the seam over and above the strength provided by the adhesive alone. The support is preferably sufficiently flexible so that it can be curved or bent to match the sides of the curved honeycomb sections that are being spliced together. It is important that the overall seam to be as narrow or thin as possible in order to minimize interference with the acoustic properties of the honeycomb cells.

Figure 4:
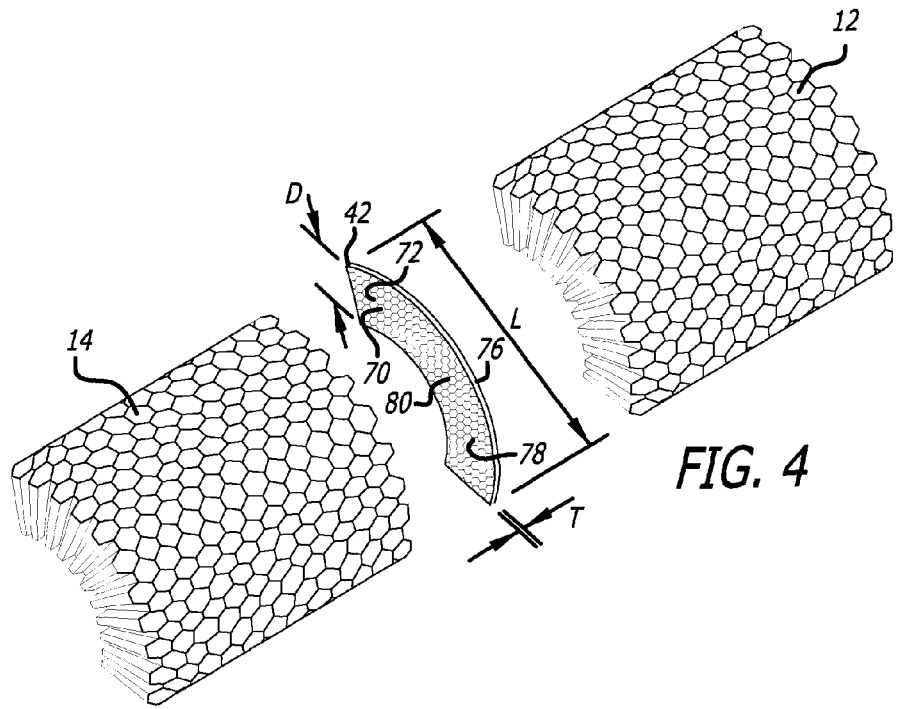
FIG. 4 is an exploded view showing two curved honeycomb sections prior to their being spliced together with a honeycomb seam in accordance with the present invention.

The exemplary seams 42, 48 and 58 shown in FIGS. 1, 2 and 3 include a honeycomb seam support that is filled with a seam adhesive. In FIG. 4, exemplary seam 42 is shown in position prior to being bonded to curved honeycomb sections 12 and 14. The seam 42 includes a honeycomb seam support structure 70 and adhesive 72. The honeycomb seam support 70 may be viewed as having a first edge 76 located adjacent to the side of the honeycomb section 12 and a second edge 78 located adjacent to the side of honeycomb section 14. The walls of the honeycomb seam support 70 extend between the first edge 76 and the second edge 78 so as to define a plurality of seam cells 80 wherein each of said seam cells has a cross-sectional area measured perpendicular to the walls of the honeycomb. The thickness (T) of the honeycomb seam support is defined by the distance between said first edge 76 and second edge 78 of the honeycomb seam support 70.

Figure 5:
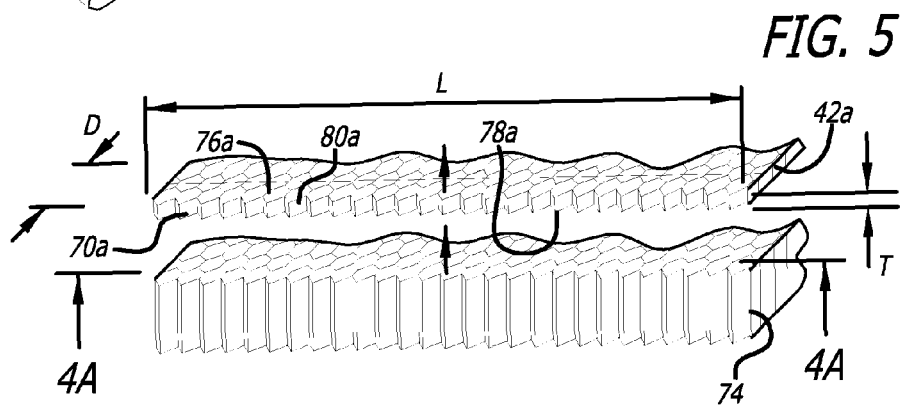
FIG. 5 depicts how a honeycomb seam support is cut from a larger honeycomb structure.

The honeycomb seam support 70 is preferably made by cutting or slicing a layer of honeycomb from a larger honeycomb structure 74 as shown in FIG. 5. The honeycomb slice 70a (FIG. 4) that is used to form seam support 70 includes identifying numbers that correspond to the above description with an "a" being added to each number to distinguish between the slice of honeycomb 70a and the final seam support 70, which includes honeycomb cells have been filled with adhesive.

Figure 6:
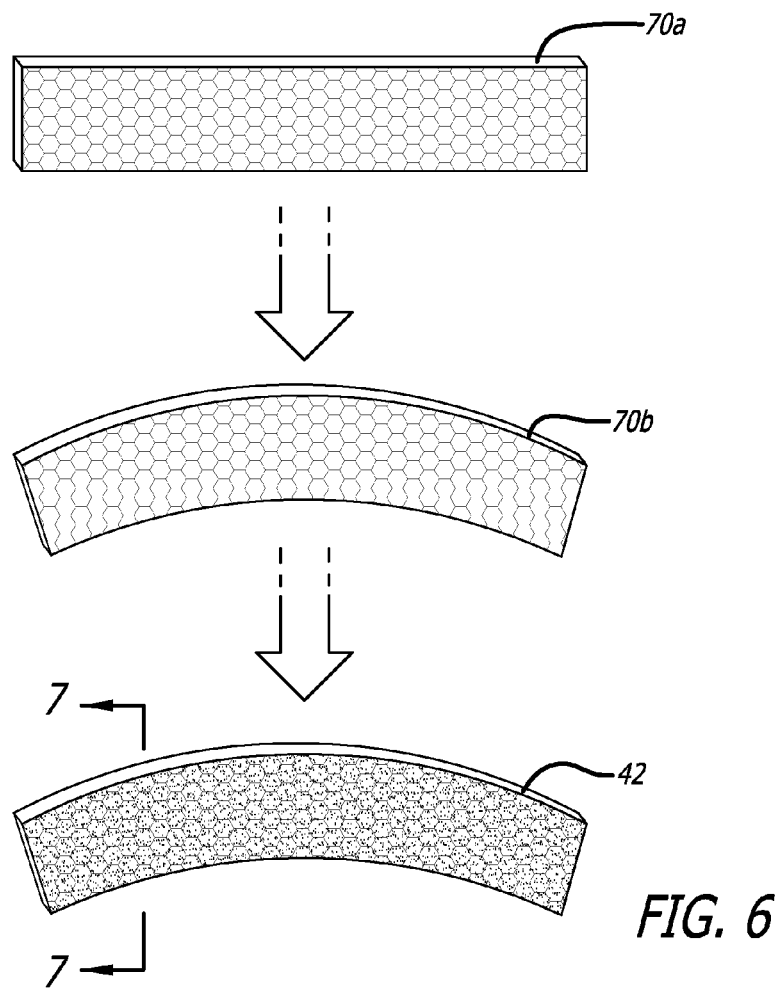
FIG. 6 shows the process by which a honeycomb seam support is curved and that then loaded it with adhesive.
Figure 7:
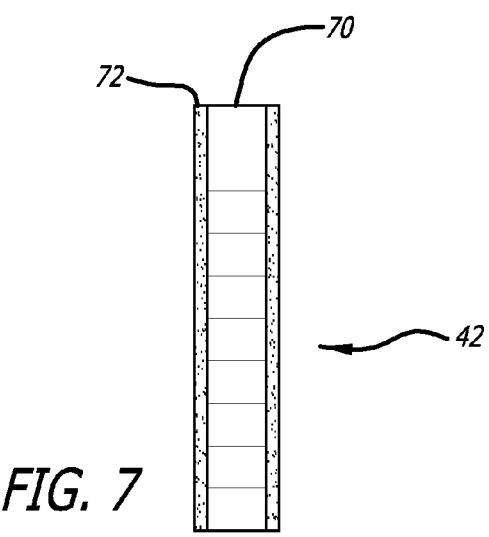
FIG. 7 is a sectional view of the FIG. 6 showing a side view of the honeycomb seam support loaded with adhesive.

As shown in FIG. 6, the slice of honeycomb 70a is formed into a curved shape 70b that matches the curve of the honeycomb sections that are being seamed together. The curved honeycomb slice 70b is then filled with adhesive to produce the final seam 42 for bonding to the two honeycomb sections. A side sectional view of the seam support 70 loaded with adhesive 72 is shown in FIG. 7. The seam support 70 is preferably from 0.01 inch to 0.15 inch thick. The adhesive protrudes out past the seam support 70 as shown at 72 in FIG. 7. The adhesive will typically protrude out from either side of the seam support in the range of 0.001 inch to 0.02 inch.

The honeycomb seam support structure is preferably loaded with the desired adhesive so that the adhesive fills substantially all of the cells in the structure and coats the edges of the seam support structure. The adhesive may extend somewhat past the edges of the honeycomb seam support, if desired, to insure complete coverage of the ends of the dog ears located on the honeycomb sections being bonded together. However, overloading the honeycomb seam support should be avoided since it generates wasted adhesive and may result in inadvertent blocking of the cells adjacent to the seam with excess adhesive.

The viscosity of the adhesive and the relative cell size of the seam support structure should be such that the adhesive is stabilized and does not flow from the structure. If desired, release paper may be placed on both sides of the adhesive-filled support structure in order to help hold the adhesive in place. The release paper is removed shortly prior to bonding of the seam to the honeycomb sections.

Figure 12:
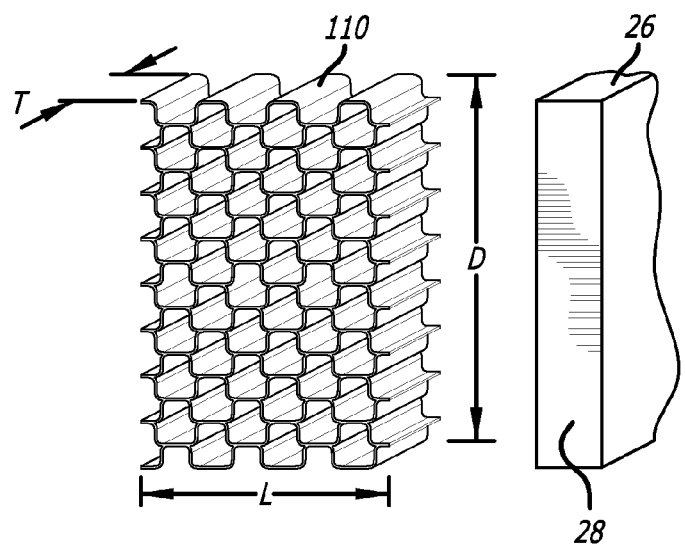
FIG. 12 shows an alternate exemplary honeycomb seam support in accordance with the present invention. The seam support is shown next to the end of a dog ear in order to show the relative size of the honeycomb cells in the seam support with respect to the end of the dog ear.

The cross-sectional configuration or shape of the honeycomb cells that form the honeycomb seam support may be varied depending upon a number of factors including the dimensions and other properties of the honeycomb sections being spliced as well as the size and desired flexibility of the seam. Conventional hexagonal honeycomb cell cross-sections, such as the cells 80 shown in seam support 70 and 70a are suitable for many applications. If desired, a wide variety of other cross-sectional configurations may be used. For example, a honeycomb seam support structure is shown at 110 in FIG. 12 where the cross-sectional shape of the honeycomb seam support is modified from the typical hexagonal shape.

The seam support structure 110 is shown next to dog ear 26 in order to provide an indication of the preferred size of the honeycomb seam support cells with respect to the length of the dog ear. As can be seen, the cells of the honeycomb seam support 110 are sized so that eight cells are present for bonding along the length (L) of the dog ear. As an example, a dog ear having a length of 1 inch requires a seam support 110 that includes cells having a height of ⅛ inch. Seam support cells having this type of the size relationship with respect to the dog ear end wall are preferred, since they provide an optimum combination of seam strength and adhesive retention.

Figure 13:
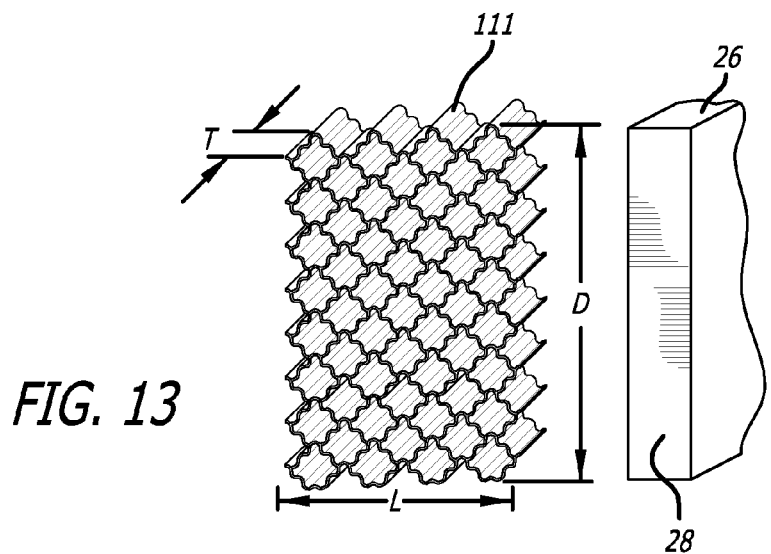
FIG. 13 shows an additional alternate exemplary honeycomb seam support in accordance with the present invention. The seam support is shown next to the end of a dog ear in order to show the relative size of the honeycomb cells in the seam support with respect to the end of the dog ear.

Another exemplary honeycomb seam support structure is shown at 111 in FIG. 13. The cross-sectional shape of the seam support 111 is useful in situations where a larger degree of flexibility in the seam support is desired. Other cell cross-sectional shapes may be used to meet specific design goals with respect to the shape, size and desired strength of the seam. The seam support structure 111 is also shown next to dog ear 26 in order to provide an indication of the preferred size of the honeycomb seam support cells with respect to the length of the dog ear. The seam support 111 is also sized so that eight cells are present for bonding along the length of the dog ear. Preferably from 5 to 20 cells are present for bonding along the length of the dog ear when the honeycomb is from ½ inch to 2 inch thick.

The seams in accordance with the present invention are formed by simply sandwiching the adhesive-loaded honeycomb seam support between the two formed acoustic honeycomb sections being spliced together and applying pressure to insure uniform contact between both sides of the seam and the honeycomb sections. Heat, is applied to set the adhesive and form the final seam.

The honeycomb structured seams of the present invention may be used to bond planar honeycomb sections together. However, the honeycomb structured seams are particularly useful for seaming together acoustic honeycomb sections that are curved in the L/D plane as shown in FIG. 4. The honeycomb sections can be spliced together and then curved to form the curved honeycomb. However, this requires that the combination of adhesive and honeycomb support structure be such that the resulting seam is sufficiently flexible that it can be bent to the desired curved shape. Preferably, the seam is applied to the two honeycomb sections after they have been formed into the desired curved shape. Splicing of pre-curved honeycomb sections is preferred because the honeycomb seam support structure is much more flexible prior to curing or setting of the adhesive.

Honeycomb sections that can be spliced together using the seams of the present invention can vary widely in cell cross-sectional area, wall thickness and depth. Typical acoustic honeycomb sections will have cells with cross-sectional areas ranging from 0.05 square inch to 1 square inch or more. The wall thicknesses of the honeycomb material will typically range from 0.001 to 0.050 inch. The depth of the cells (core thickness) ranges from 0.25 to 3 inches or more. An exemplary honeycomb section will have hexagonal cells that have a cross-sectional area of around 0.1 to 0.5 square inch, wall thicknesses of around 0.025 to 0.05 inch and a depth of around 1.0 to 2.0 inches.

The protruding wall ends for honeycombs having the size ranges set forth above will have lengths (L) of from 0.25 to 3 inches or more, which corresponds to the depth of the honeycomb core. The thickness (T) of the protruding walls, which corresponds to the thickness of the honeycomb material, will be from 0.001 inch to 0.050 inch. The size of the seam cells is selected so that multiple seam cells contact the wall end along its length shown in FIGS. 12 and 13. Typical seam cell sizes range from a 0.062 to 0.187 inch. This provides more cell edge contact for the dog years and the smaller cells help stabilize the adhesive film in the cell.

The relative size of the seam cell with respect to the length of the wall end can be varied to achieve desired seam design objectives. In general, smaller seam cells provide more surface area and seam cell bonding sites along the wall end length to produce relatively stronger and stiffer seams.

A portion of an alternative adhesive support is shown at 82 in FIGS. 8 and 9. The adhesive support 82 is a linked-segment seam support that is composed of seam support members 84, 86 and 88. Only three segments of the seam support are shown for demonstrative purposes. A typical seam will be composed of numerous linked support members. The support members each have a first end 90 and a second end 92. They also have a first side 94 that is located adjacent to the side of one honeycomb section and a second side 96 that is located adjacent to the side of the other honeycomb section. A flexible joint 98 is provided for connecting the first end 90 of one seam support member to the second end 92 of the other seam support member. Many different types of flexible joints are possible. Joints that add the least amount of weight are preferred. A preferred flexible joint is shown in FIG. 7 where seam support member 88 has a circular flange 100 that is formed in opening 102 of seam support member 86 to hinge the two support members together. This type of flexible connection is preferred because it adds little, if any, weight to the seam support.

The seam adhesive is located on both sides of the adhesive support 82 and the supported-adhesive is then used to splice honeycomb sections together in the same manner as the honeycomb seam supported adhesive described above. The amount of adhesive should be limited to the amount necessary to provide some adhesive fillet formation at the dog ears in order to form strong bonds. The use of excess adhesive should be avoided as it adds to the weight of the seam. In some situations, it may be desirable to apply adhesive only to those portions of the adhesive support that contacts the dog ears. However, this may not be practical when the side of the honeycomb contains many closely spaced dog ears. In these situations, it is preferred that the sides of the adhesive support members be substantially covered with a layer of adhesive The material used to make the adhesive support 82 can be any of the same materials that are used to make the honeycomb. The material should be sufficiently thin that is can be flexed to provide some flexibility to the seam in the T direction. It is preferred that the adhesive support material be the same as that used in making the honeycomb sections. The thickness of the material can be varied with it being preferred that the material be as thin as possible while still providing an increase in seam strength. Preferred exemplary material thicknesses will match that of the honeycomb walls that are being spliced together. Exemplary material for acoustic honeycomb is aluminum or composite material that is from 0.001 to 0.010 inch thick. The preferred thickness of the adhesive on either side of the linked-seam support should be about 0.010 to 0.075 inch per side.

An exemplary spliced acoustic honeycomb is shown in FIG. 10 where three honeycomb sections 104, 106 and 108 are spliced together along two seams 130 and 132. The honeycomb sections all include septum caps 134. The spliced honeycomb sections are sandwiched between a solid panel or face sheet 136 and a perforated panel or face sheet 138. The face sheets are bonded to the edges of the spliced honeycomb using conventional panel fabrication processes.

Figure 11:
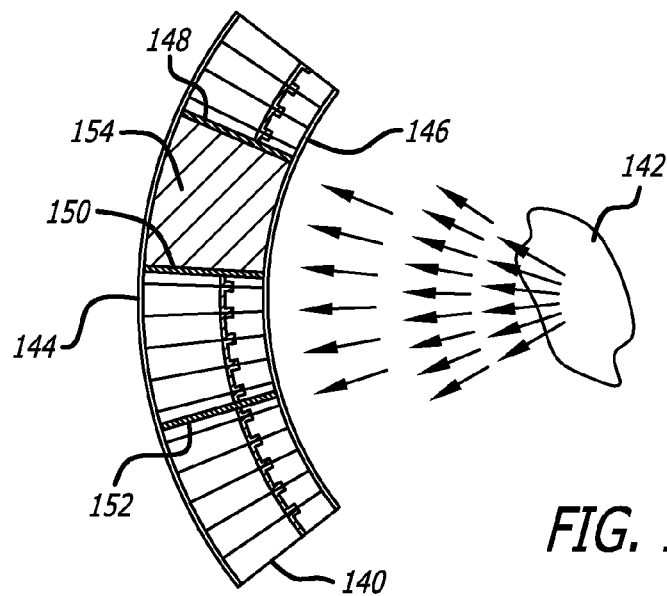
FIG. 11 shows a curved acoustic panel that includes acoustic honeycomb sections that are spliced or seamed together in accordance with the present invention.

A section of a curved spliced honeycomb acoustic panel or nacelle is shown at 140 in FIG. 11. The jet engine core or other noise source is represented schematically at 142. The curved acoustic panel includes outer solid face sheet 144 and inner perforated face sheet 146. The various honeycomb sections are spliced together with vertically oriented seams 148, 150 and 152. Seam 154 extends horizontally between seams 148 and 150. The spliced curved acoustic honeycomb sections are from 0.75 inch to 1.5 inch thick with the seams being from 0.02 inch to 0.20 inch thick. As a feature of the invention, the relatively thin seams that are made using the combination of adhesive and adhesive support were found to provide suitable seaming of the honeycomb sections together, while at the same time having a minimal effect on the acoustic properties of the acoustic panel or nacelle. He

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A spliced honeycomb comprising:
a first honeycomb section comprising a first edge and a second edge, said first honeycomb section further comprising a plurality of walls that extend between said first and second edges, said walls defining a plurality of honeycomb cells wherein each of said honeycomb cells has a cross-sectional area measured perpendicular to said walls and a depth defined by the distance between said first and second edges, said first honeycomb section further comprising a first honeycomb side that comprises a plurality of protruding honeycomb walls that each comprise a wall end having a length extending between said first edge and said second edge and a thickness;
a second honeycomb section comprising a first edge and a second edge, said second honeycomb section further comprising a plurality of walls that extend between said first and second edges, said walls defining a plurality of honeycomb cells wherein each of said honeycomb cells has a cross-sectional area measured perpendicular to said walls and a depth defined by the distance between said first and second edges, said second honeycomb section further comprising a second honeycomb side that comprises a plurality of protruding honeycomb walls that each comprise a wall end having a length extending between said first edge and said second edge and a thickness; and
a seam that is located between said first honeycomb section and said second honeycomb section to adhesively bond said first honeycomb side to said second honeycomb side, said seam having a depth extending between said first and second edges of said first and second honeycomb sections, a thickness and a seam length that extends along said first and second sides, said seam comprising an adhesive for bonding to the wall ends of said first and second honeycomb sides and a honeycomb seam support for said adhesive, said honeycomb seam support comprising a first edge located adjacent to said first honeycomb side and a second edge adjacent to said second honeycomb side, said honeycomb seam support further comprising a plurality of walls that extend between said first and second edges of said honeycomb seam support, said walls defining a plurality of seam cells wherein each of said seam cells has a cross-sectional area measured perpendicular to said walls and a thickness defined by the distance between said first and second edges, wherein said adhesive is located in said seam cells.

2. A spliced honeycomb according to claim 1 wherein said honeycomb seam support has a top edge located between the first edges of said first and second honeycomb sections and a bottom edge located between the second edges of said first and second honeycomb sections, wherein the top edge of said honeycomb seam support is curved.

3. A spliced honeycomb according to claim 2 wherein the top edge of said honeycomb seam support is in the form of an arch.

4. A spliced honeycomb according to claim 1 wherein said first and second honeycomb sections comprise acoustic septums located in said honeycomb cells.

5. A spliced honeycomb according to claim 4 wherein said septums comprise septum caps that have been adhesively bonded to the walls of said honeycomb cells.

6. A spliced honeycomb according to claim one wherein the thickness of said seam it is from 1.01 inch to 0.20 inch.

7. An engine nacelle comprising a spliced honeycomb according to claim 4.

8. A jet engine comprising an engine nacelle according to claim 7.

9. A method for splicing honeycomb sections together, said method comprising the steps of:
providing a first honeycomb section comprising a first edge and a second edge, said first honeycomb section further comprising a plurality of walls that extend between said first and second edges, said walls defining a plurality of honeycomb cells wherein each of said honeycomb cells has a cross-sectional area measured perpendicular to said walls and a depth defined by the distance between said first and second edges, said first honeycomb section further comprising a first honeycomb side that comprises a plurality of protruding honeycomb walls that each comprise a wall end having a length extending between said first edge and said second edge and a thickness;
providing a second honeycomb section comprising a first edge and a second edge, said second honeycomb section further comprising a plurality of walls that extend between said first and second edges, said walls defining a plurality of honeycomb cells wherein each of said honeycomb cells has a cross-sectional area measured perpendicular to said walls and a depth defined by the distance between said first and second edges, said second honeycomb section further comprising a second honeycomb side that comprises a plurality of protruding honeycomb walls that each comprise a wall end having a length extending between said first edge and said second edge and a thickness; and
forming a seam that is located between said first honeycomb section and said second honeycomb section to adhesively bond said first honeycomb side to said second honeycomb side, said seam having a depth extending between said first and second edges of said first and second honeycomb sections, a thickness and a seam length that extends along said first and second sides, said seam comprising an adhesive for bonding to the wall ends of said first and second honeycomb sides and a honeycomb seam support for said adhesive, said honeycomb seam support comprising a first edge located adjacent to said first honeycomb side and a second edge adjacent to said second honeycomb side, said honeycomb seam support further comprising a plurality of walls that extend between said first and second edges of said honeycomb seam support, said walls defining a plurality of seam cells wherein each said seam cells has a cross-sectional area measured perpendicular to said walls and a thickness defined by the distance between said first and second edges wherein said adhesive is located in said seam cells.

10. A method for splicing honeycomb together according to claim 9 wherein said honeycomb seam support has a top edge located between the first edges of said first and second honeycomb sections and a bottom edge located between the second edges of said first and second honeycomb sections, the top edge of said honeycomb seam support is curved.

11. A method for splicing honeycomb together according to claim 10 wherein the top edge of said honeycomb seam support is in the form of an arch.

12. A method for splicing honeycomb together according to claim 9 wherein said first and second honeycomb sections comprise acoustic septums located in said honeycomb cells.

13. A method for splicing honeycomb together according to claim 12 wherein said septums comprise septum caps that have been adhesively bonded to the walls of said honeycomb cells.

14. A method for making an engine nacelle that comprises splicing honeycomb together according to claim 12.

15. A method for making a jet engine that comprises making an engine nacelle according to claim 14.

16. A method for splicing honeycomb together according to claim 9 wherein the thickness of said seam is from 0.01 inch to 0.20 inch.

* * * * *